United States Patent
Venkatakrishnan et al.

(10) Patent No.: US 11,405,334 B2
(45) Date of Patent: *Aug. 2, 2022

(54) SELECTION OF MEMBER PORTS IN A LINK AGGREGATION GROUP

(71) Applicant: Juniper Networks, Inc., Sunnyvale, CA (US)

(72) Inventors: Srinivasan Venkatakrishnan, Bangalore (IN); Prabhu Raj V. K, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,138

(22) Filed: Oct. 19, 2020

(65) Prior Publication Data

US 2021/0036969 A1 Feb. 4, 2021

Related U.S. Application Data

(63) Continuation of application No. 16/294,133, filed on Mar. 6, 2019, now Pat. No. 10,812,414.

(51) Int. Cl.
*H04L 49/253* (2022.01)
*H04L 43/0876* (2022.01)

(52) U.S. Cl.
CPC ........ *H04L 49/253* (2013.01); *H04L 43/0876* (2013.01)

(58) Field of Classification Search
None
See application file for complete search history.

(56) References Cited

U.S. PATENT DOCUMENTS 6,801,527 B1 10/2004 O'Keeffe et al.
10,812,414 B2 10/2020 Venkatakrishnan et al.
(Continued)

FOREIGN PATENT DOCUMENTS

CN 1809022 A 7/2006
CN 103401801 A 11/2013

OTHER PUBLICATIONS

IEEE Std 802.3ad-2000 "Aggregation of Multiple Link Segments" Amendment to Carrier Sense Multiple Access with Collision Detection (CSMA/CD) Access Method and Physical Layer Specifications, 2000, 182 pgs.
(Continued)

*Primary Examiner* — Christine T Duong
(74) *Attorney, Agent, or Firm* — Shumaker & Sieffert, P.A.

(57) ABSTRACT

This disclosure describes techniques that include selecting a member port of an aggregation bundle by evaluating utilization of paths, within a router, to member ports of an aggregation bundle. In one example, this disclosure describes a method that includes receiving network data to be output through an aggregation bundle having a plurality of member ports; identifying local member ports; identifying non-local member ports, each of the non-local member ports being reachable from the receiving line card over a path through the switch fabric to a different one of the plurality of line cards; identifying available non-local member ports by determining, for each non-local member port, whether the path through the switch fabric has low utilization; and selecting a member port by applying a hashing algorithm to a group that includes each of the identified available non-local member ports.

20 Claims, 8 Drawing Sheets

(56) References Cited

U.S. PATENT DOCUMENTS

2012/0207175 A1    8/2012    Raman et al.
2014/0119193 A1    5/2014    Anand et al.
2014/0301401 A1   10/2014   Wang et al.
2020/0204494 A1*  6/2020    Immidi ................ H04L 45/245

OTHER PUBLICATIONS

Extended Search Report from counterpart European Application No. 19180801.3, dated Nov. 19, 2019, 9 pp.

Notice of Allowance received in parent U.S. Appl. No. 16/294,133, dated Jun. 22, 2020, 9 pp.

Response to Extended Search Report dated Nov. 19, 2019 from counterpart European Application No. 19180801.3, filed Mar. 8, 2021, 14 pp.

Second Notice of Intent to Grant and Text Intended to Grant from counterpart European Application No. 19180801.3 dated Sep. 27, 2021, 34 pp.

Second Office Action and Search Report, and translation thereof, from counterpart Chinese Application No. 201910568245.7 dated Nov. 2, 2021, 6 pp.

Extended Search Report from counterpart European Application No. 21190853.8 dated Nov. 11, 2021, 10 pp.

\* cited by examiner

SUB-MEMBER PORT SET: P6 + P7

GLOBAL-MEMBER PORT SET: P6 + P7 + P2 + P3

SUB-MEMBER PORT SET: P6 + P7

GLOBAL-MEMBER PORT SET: P6 + P7 + P2 + P3

SUB-MEMBER PORT SET: NULL

GLOBAL-MEMBER PORT SET: P4 + P5 + P6 + P7

SELECTION OF MEMBER PORTS IN A LINK AGGREGATION GROUP

CROSS REFERENCE

This application is a continuation application of and claims priority to U.S. patent application Ser. No. 16/294,133 filed on Mar. 6, 2019, which is hereby incorporated by reference herein in its entirety.

TECHNICAL FIELD

This disclosure relates to network devices and, more particularly, to network devices that provide link aggregation.

BACKGROUND

In computer networks, a network device, such as a router, may be connected to one or more network devices via two or more physical links. The term "link" is often used to refer to the connection between two devices on a network. The link may be a physical medium, such as a copper wire, a coaxial cable, any of a host of different fiber optic lines, or a wireless connection. In addition, network devices may define "virtual" or "logical" links, and map the virtual links to the physical links. In some cases, these two or more links may be logically grouped or aggregated together to form an "aggregated bundle." For example, one or more routers may be connected to a customer edge device via an aggregate bundle of multiple physical links. In some cases, Ethernet links may be combined into one logical interface for higher bandwidth and redundancy. Ports of the Ethernet links that are combined in this manner are referred to as a link aggregation group (LAG) or bundle.

Generally, link aggregation may improve bandwidth in comparison to that of a single link, while also providing connection redundancy. That is, aggregation of links into logical bundles may result in an available bandwidth of all of the aggregated links combined. In addition, should one of the links of the aggregated bundle fail, the network device may begin sending traffic to the other network device across the non-failed links of the aggregated bundle, thereby providing redundancy in the form of redundant links for delivery of traffic between two devices.

SUMMARY

This disclosure describes techniques that include selecting a member port of an aggregation bundle by evaluating utilization or available bandwidth along paths, within a router, to those member ports of the aggregation bundle. For instance, in accordance with one or more techniques described herein, when network data is received that is intended for output over an aggregation bundle, selecting one of the member ports for output may include applying a hashing algorithm to select from a group of candidate member ports. The member ports included within that group of candidate member ports may, in some examples, be determined by identifying those member ports of the aggregation bundle that are reachable over a path through switch fabric that has relatively low utilization. Where more than one candidate member port is identified, the hashing algorithm may be applied to select one member port from the group of candidates. In some examples, member ports of the aggregation bundle that are local (e.g., those that do not need to be accessed through the switch fabric) may be included within the group of candidates that may receive the network data intended for the aggregation bundle.

Identifying which paths to a member port are considered to be relatively low utilization paths may include, in some examples, comparing the utilization of each of the paths to a threshold value. In one example, those paths having a utilization value that is less than the threshold value may be considered to be low-utilization paths. In another example, more than one threshold may be used, such that paths having utilization that is less than a low threshold may be considered to be low-utilization paths. In some examples, two thresholds might be used, such that where there are no paths with utilization less than a low threshold, the utilization of the paths may be compared to a high threshold, and those paths that are less than the high threshold may be considered candidate member ports for receiving the network data intended for the aggregation bundle.

The techniques described herein may provide certain technical advantages. For instance, by considering the utilization of paths through the switch fabric when selecting a member port of an aggregation bundle, the switch fabric may more efficiently and effectively used, avoiding placing traffic on already-congested paths, and increasing the utilization of low-utilization paths. Such a practice may reduce the likelihood of further congestion and/or dropped network data units. Also, by comparing utilization rates to both a low and a high threshold, paths through the switch fabric that have very low utilization (i.e., less than the low threshold) can be more effectively identified and distinguished from other paths that might not be highly congested but that are not among a group of available paths that have very low utilization. And with two thresholds, where there are no paths through the switch fabric having very low utilization, but there are nevertheless paths to member ports that are not highly congested (i.e., those with utilization less than the high threshold), such paths can be identified and distinguished from other paths more effectively than a single-threshold system. Comparing utilization rates to both a low and a high threshold thus may enable effective member port selection by effectively and efficiently reducing the number of candidate member ports to which a hashing algorithm may be applied, while also not overly complicating member port selection logic.

In some examples, this disclosure describes operations performed by a network router or other network device. In one specific example, this disclosure describes a method comprising receiving, by a receiving line card, network data to be output through an aggregation bundle having a plurality of member ports, each member port associated with one of a plurality of line cards interconnected through a switch fabric, the plurality of line cards including the receiving line card; identify, by the receiving line card, an available non-local member port from the plurality of member ports that is reachable from the receiving line card over a low-utilization path through the switch fabric to a different one of the plurality of line cards; selecting, by the receiving line card, a member port by applying a hashing algorithm to a group that includes the identified available non-local member port; and outputting, by the receiving line card, the network data over a fabric interface to reach the selected member port.

In other examples, this disclosure describes one or more systems, components, or devices that perform various operations as described herein. In still other examples, this disclosure describes a computer-readable storage medium comprising instructions that, when executed, configure pro-

DETAILED DESCRIPTION

Figure 1:
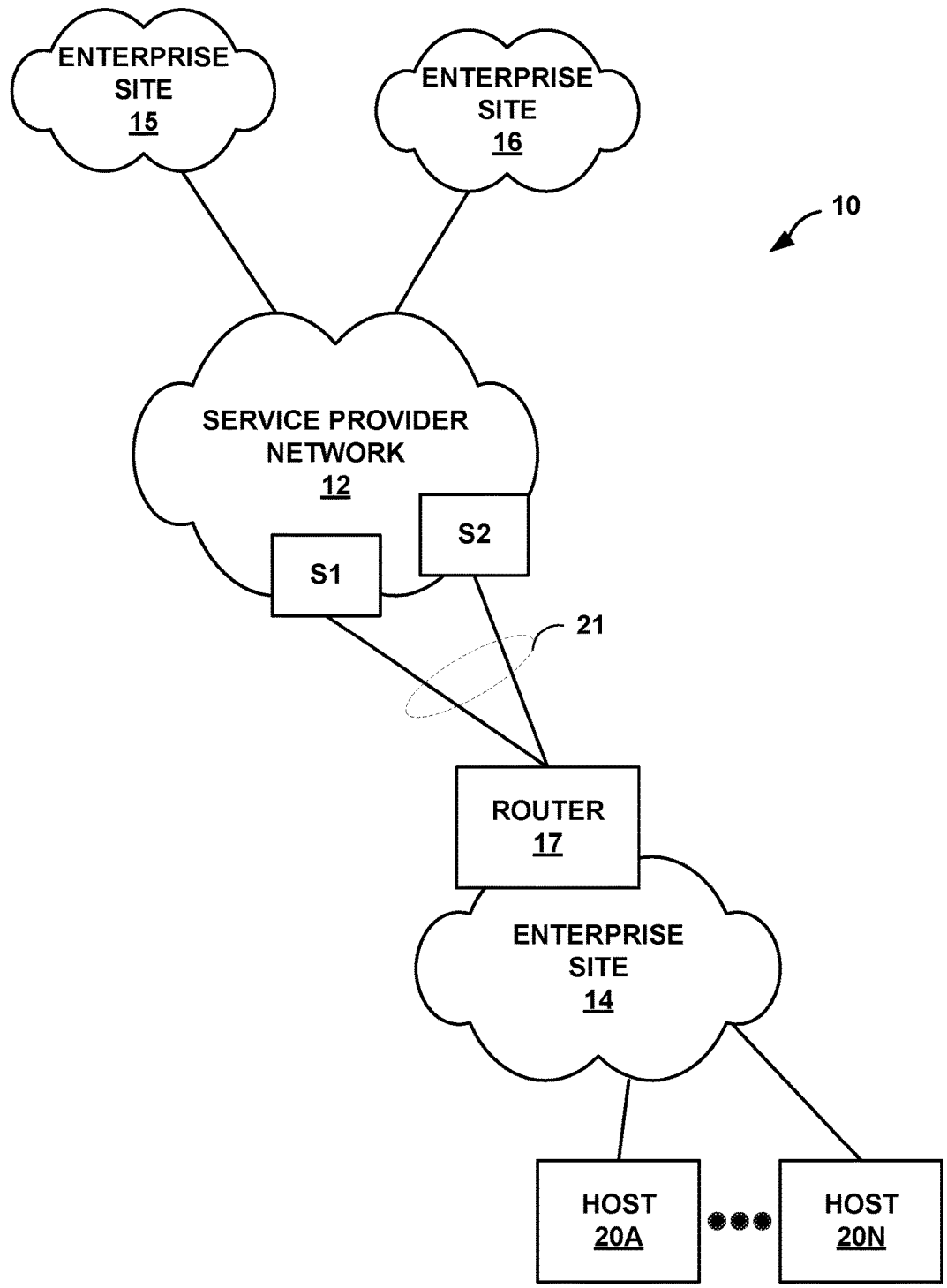
FIG. 1 is a block diagram illustrating an example enterprise network with an enterprise site having a router configured to operate in accordance with the techniques of this disclosure.

FIG. 1 is a block diagram illustrating an example network 10 with an enterprise site 14 connected to a service provider network 12 through router 17 and routers or switches S1 and S2, in accordance with the techniques of this disclosure. Router 17 may be an edge or customer edge device, and may represent any network device capable of interfacing with service provider network 12 to forward traffic to and receive traffic from service provider network 12, thereby providing connectivity between hosts or endpoints within network 10, including local hosts 20A-20N (collectively "hosts 20") within enterprise site 14 as well as hosts included in enterprise sites 15 and 16.

Enterprise sites 14, 15, and 16 may be geographically separated enterprise sites that belong to a single enterprise, such as a university, corporation, business, or other large entity. Each of the enterprise sites 14, 15, and 16 may comprise a private network, such as a local area network (LAN) or wide area network (WAN) that includes a plurality of hosts, e.g., hosts 20 within enterprise site 14. As an example, hosts 20 may include data servers, switches, or customer devices, such as desktop computers, laptops, workstations, personal digital assistance (PDAs), Internet of Things (JOT) devices, wireless devices, network-ready appliances, file servers, print servers or other devices.

One or more hosts (not shown) within enterprise sites 15 and 16 may be logically connected to one or more of hosts 20 within enterprise site 14 across service provider network 12. The hosts within each of the enterprise sites 14, 15, and 16 may each be included in one or more virtual LANs (VLANs), which are groups of devices on one or more LANs that are configured to communicate as if they are attached to the same wire.

As further shown in the example of FIG. 1, enterprise site 14 may include a router 17, which in some examples, may be customer edge (CE) device representing any network device capable of interfacing with service provider network 12 to forward traffic to and receive traffic from service provider network 12. In some examples, router 17 may be a L2 network device commonly referred to as a "switch" that switches (rather than routes) traffic from enterprise site 14 to service provider network 12 and from service provider network 12 to enterprise site 14.

Often, for large customers that operate relatively larger customer networks, service providers employ what is referred to as "aggregated bundles" to interconnect routers and CE devices via two or more links. Example aggregated bundles include aggregated Ethernet bundles, which may be configured and maintained using a link aggregation control protocol (LACP), as defined in IEEE 802.3ad, entitled "Aggregation of Multiple Link Segments," the contents of which are incorporated herein by reference. Logically, these aggregated bundles appear as a single connection to the router and/or the CE device. Aggregated bundles provide a number of benefits. First, aggregated bundles may provide redundancy of connection between the routers and CE devices. To illustrate, should one of the link of the aggregated bundle fail, the router and CE device interconnected by the aggregated bundle may redirect traffic previously being sent over the failed links of the aggregated bundle to one of the active links of the aggregated bundle, thereby providing redundancy of connection between a router and a CE device.

Second, use of aggregated bundles may provide increased network capacity (which is often measured in terms of bandwidth) considering that the multiple links of the aggregated bundle may be employed to deliver traffic rather than a single link. Third, aggregated bundles may promote bandwidth scalability in that a service provider may establish an aggregated bundle with two links, as one example, and then incrementally increase the number of links in the aggregated bundle in response to increased subscriber bandwidth demand. In this manner, the service provider may slow capital outlays by only providing sufficient bandwidth to meet current subscriber bandwidth demand rather than expected future subscriber bandwidth demand.

In the example of FIG. 1, router 17, switch S1 and switch S2 work in conjunction with one another to provide an aggregated bundle of links 21 (which may also be referred to as "aggregated bundle 21"). In some examples, router 17, switch S1, and switch S2 (collectively, "routing devices 17") may be or may be described as separate devices, but in other examples aggregated bundle 21 may be provided by a single device having multiple chassis, in which case router 17 and associated devices may represent different chassis of a multi-chassis router. Accordingly, the techniques described in this disclosure should not be limited in this respect to the particular example of FIG. 1.

Router 17 may be configured to provide hosts 20 with access to service provider network 12 via router 17, and to provide hosts 20 with connectivity for host-to-host traffic within enterprise site 14. Service provider network 12, in turn, provides hosts within enterprise sites 15 and 16, with access to enterprise site 14.

Service provider network 12 may be coupled to one or more networks (not shown) administered by other providers, and may thus form part of a large-scale public network infrastructure, e.g., the Internet. Service provider network 12, therefore, may provide hosts or endpoints within enterprise sites 14, 15, and 16 with access to the Internet. Router 17 may perform Layer 3 routing to route network traffic between enterprise site 14 and enterprise sites 15, 16 using service provider network 12. Service provider network 12 may include a variety of network devices other than router 17, such as other provider edge (PE) routers, core routers, customer edge (CE) routers, and switches.

Although additional network devices are not shown for ease of explanation, network 10 may comprise additional networks, enterprise sites, and/or data centers including, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network 10 are illustrated as being directly coupled, one or more additional network elements may be included along any links between service provider network 12 and enterprise sites 14, 15, or 16, and any links between enterprise site 14 and hosts 20, such that the network elements of network 10 are not directly coupled.

As further described herein, router 17 may be connected by a plurality of links to service provider network 12 and configured as a link aggregation group (LAG) client in which the physical connections are viewed as one logical connection, represented as LAG 21. Moreover, two or more devices included in service provider network 12 (shown as switch S1 and switch S2) may be routers/switches configured to operate as a multi-chassis link aggregation group (MC-LAG) peer devices within a MC-LAG, allowing router 17 for form a logical LAG interface between the two MC-LAG peers. The MC-LAG, which may include an active MC-LAG peer device and a standby MC-LAG peer device connected via an inter-chassis link (ICL) for inter-chassis redundancy, may provide high availability of service provider network 12 within network 10. In such an example, router 17 may be a chassis-based router that may forward network data across member ports of the link aggregation group. To do so, router 17 may choose one or more member ports of the link aggregation group through a hashing algorithm. Selection of a member port of the LAG is decided based on the hashing algorithm, which may operate on packet headers (L2, L3, and L4). However, in some cases, the hashing algorithm will select a member port that requires that the network data be communicated over switch fabric that is already highly utilized, even if other member ports might be reachable over a path (e.g., through the switch fabric) that might not be as highly utilized.

In accordance with one or more aspects of the present disclosure, router 17 may select a member port of the link aggregation group based on the bandwidth usage or utilization of a path to the member port through internal switch fabric (not shown in FIG. 1) within router 17. For instance, router 17 may identify a set of member ports reachable through relatively low-utilized paths through the internal switch fabric within router 17. Once such an identified set of member ports is identified, router 17 may apply a hashing algorithm to select a member port from among the set of member ports reachable through the relatively low-utilized paths. Router 17 may then route data to the selected member port over the relatively low-utilized path. By routing over the relatively low-utilized path to the selected member port, router 17 may tend to avoid further congestion and/or packet loss. Although link aggregation bundles are described herein in most examples, techniques in accordance with one or more aspects of this disclosure may apply to other bundles, such as ECMP bundles.

Figure 2:
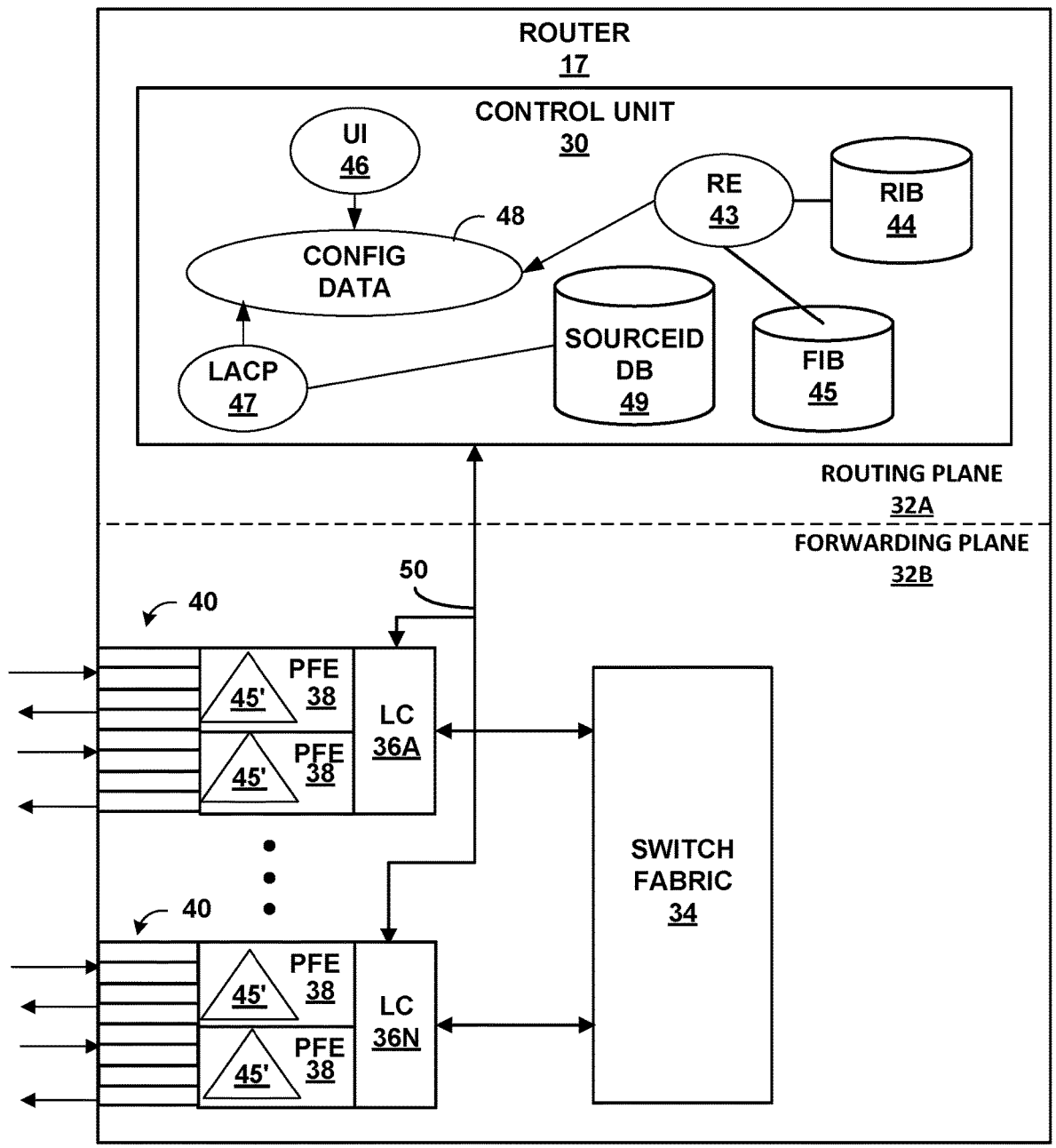
FIG. 2 is a block diagram illustrating an example router, in accordance with one or more aspects of the present disclosure.

FIG. 2 is a block diagram illustrating an example router, in accordance with one or more aspects of the present disclosure. In the example of FIG. 2, router 17 may correspond to router 17 of FIG. 1. That is, router 17 of FIG. 1 may include components similar to the components described with respect to router 17 of FIG. 2. In other examples, router 17 of FIG. 2 may include additional or different features and capabilities.

In the example of FIG. 2, router 17 includes a control unit 30 that provides control or routing plane functionality for router 17 within routing plane 32A. Router 17 also includes switch fabric 34 interconnecting a set of line cards ("LCs") 36A-36N, each of which includes one or more packet-forwarding engines ("PFEs") 38 that send and receive traffic by a set of interface cards (IFCs) 40 ("IFCs 40") that typically have one or more physical network interfaces (LAG member ports). LCs 36, components thereof, and switch fabric 34 collectively provide a data plane (or forwarding plane) for forwarding network traffic, such as downstream and upstream subscriber traffic. This forwarding plane is shown as forwarding plane 32B in the example of FIG. 2. Although not shown in FIG. 2, PFEs 38 may each comprise a central processing unit (CPU), memory, and one or more programmable packet-forwarding application-specific integrated circuits (ASICs). Switch fabric 34 provides a high-speed interconnect for forwarding incoming data packets between PFEs 38 for transmission over a network, such as service provider network 14 shown in the example of FIG. 1.

Control unit 30 may provide an operating environment for various protocols that perform routing plane functions for router 17. For example, control unit 30 may provide an operating environment for execution of a routing engine (RE) 43 ("RE 43") that implements a routing protocol to control L3 routing functions. In general, routing engine 43 receives and sends routing protocol messages to maintain a routing information base (RIB) 44 ("RIB 44") that stores L3 routing information representative of a topology of service provider network 14. Based on RIB 44, RE 43 generates a forwarding information base (FIB) 45 ("FIB 45") that stores forwarding data structures for installation within PFEs 38, e.g., by programming PFEs 38.

In the example of FIG. 2, control unit 30 may include a user interface ("UP") module 46 ("UI 46") with which an administrator interacts, either directly or by way of a provisioning system or software agent, to configure one or more logical interfaces corresponding to each of the active subscribers that own and operate customer network 16. UI 46 may receive commands in accordance with a command syntax and store these commands as configuration data 48 ("config data 48"). UI 46 may also receive commands to configure, for each of the logical interfaces, a primary scheduling module and one or more backup scheduling modules, also storing these commands as configuration data 48.

Control unit 30 includes a link aggregation control protocol (LACP) module 47 that operates to bundle one or more of interfaces S1 into MC-LAG 22 and treat bundle 22 as a single logical interface in terms of L2 forwarding. While shown as implementing LACP, control unit 30 may implement or otherwise provide an execution environment for any other type of aggregated bundle protocol capable of establishing aggregated bundles of logical and/or physical interfaces. LACP module 47 generally provides the abstraction to maintain MC-LAG 22.

Control unit 30 further includes SourceID database (DB) 49 that stores SourceID values, and corresponding values representative of identifiers for devices that initially receive packets for an MC-LAG and identifiers for the MC-LAGs. SourceID DB 49 may be configured as a relational database where the SourceID values act as key values. In this manner, the SourceID value, an identifier for a source of a packet for an MC-LAG, and an identifier for the MC-LAG may be stored as a triplet in SourceID DB 49, and each entry in SourceID DB 49 may conform to this triplet structure. In some examples, the SourceID value is a 16-bit value.

In the example of FIG. 2, control unit 30 is connected to each of LCs 36 by a dedicated internal communication link 50. For example, dedicated link 50 may comprise a Gigabit Ethernet connection for internal communication between the multiple components of router 17. In one example, control unit 42 communicates data representative of a software copy 45' of FIB 45 into PFEs 38 to program PFEs 38 and thereby control forwarding of traffic by the corresponding components within forwarding plane 32B. This allows the software FIB stored in memory (e.g., on-chip RAM) of in each of PFEs 38 to be updated without degrading packet-forwarding performance of router 17. In some instances, control unit 30 may derive separate and different software FIBs for each respective one of PFEs 38. In addition, one or more of PFEs 38 may include packet-forwarding ASICs (not shown) that PFEs 38 program with a hardware-copy of FIB based on the software FIBs (i.e., hardware versions of the software FIBs) copied to each respective PFE 38. In other, more complex examples, router 17 may have many more LCs 36 (e.g., 48 or 64 FPCs), each of which may have up to four PFEs 38 that each couple to up to sixteen interface cards 40.

In some examples, when one of PFEs 38 receives a packet, the PFE may determine, from software copy 45' of FIB 45, whether the packet is to be forwarded according to an MC-LAG. For instance, as discussed above, LACP module 47 may update configuration data 48 to indicate that packets having a particular network five-tuple (source IP address, destination IP address, source port, destination port, and protocol) are to be forwarded using MC-LAG. Then, control unit 30 may update FIB 45 with data indicating that such packets are to be forwarded using MC-LAG, and moreover, updated software copies 45' of FIB 45 on PFEs 38 of LCs 36. Accordingly, when PFEs 38 receive a packet, PFEs 38 can determine whether the packet is to be forwarded using an MC-LAG.

When a packet is to be forwarded using an MC-LAG, the PFE 38 that received the packet may select one of member ports associated with IFCs 40 for forwarding the packet. For instance, LC 36A may output the packet over a member port associated with the IFCs 40 included within LC 36A. In other examples, LC36A may output the packet over a member port associated with the IFCs 40 included within line card that is different than LC 36A (e.g., LC 36N). In the latter case, LC36A forwards the packet over switch fabric 34 to reach the other LC (e.g., LC 36N). Once the packet reaches the LC that will output the packet (e.g., LC 36N), that LC outputs the packet over the selected member port. In some situations, paths from LC 36A to other LCs through switch fabric 34 may have varying degrees of utilization and/or congestion. Some LCs may be reachable by LC 36A over highly-utilized and overcrowded paths through switch fabric 34, whereas other LCs may be reachable by LC 36A over less utilized paths through switch fabric 34.

In accordance with one or more aspects of the present disclosure, LC 36A may choose a member port based on the extent to which a path within switch fabric 34 to another LC is utilized, or based on the fabric interface bandwidth usage for switch fabric 34. For instance, if LC 36A determines that a path to LC 36N over switch fabric 34 is highly utilized, LC 36A may choose a member port associated with a different LC, where the different LC is reachable through a path within switch fabric 34 that is less utilized than the path to LC 36N.

The operating environment of control unit 30 may be implemented solely in hardware, or may be implemented as a combination of hardware and software or firmware. For example, control unit 30 may include one or more processors which execute software instructions. In that case, control unit 30 may include various software modules or daemons executing on an operating system, and may include a non-transitory computer-readable storage device, such as computer memory or hard disk, for storing executable instructions.

The architecture of router 17 illustrated in FIG. 2 is shown as an example, and the present disclosure is not limited to this architecture. In other examples, router 17 may be configured in a variety of ways. In one example, for example, some of the functionally of control unit 30 may be distributed within PFEs 38. Elements of control unit 30 may be implemented solely in software that executes on hardware, or hardware, or may be implemented as combinations of hardware and software or firmware. For example, control unit 30 may include one or more processors, one or more microprocessors, digital signal processors (DSPs), application specific integrated circuits (ASICs), field programmable gate arrays (FPGAs), network processors, or any other equivalent integrated or discrete logic circuitry, or any combination thereof, which execute software instructions. In that case, the various software modules of control unit 30 may comprise executable instructions stored, embodied, or encoded in a non-transitory computer-readable medium, such as a computer-readable storage medium, containing instructions.

Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other non-transitory computer-readable media. Computer-readable media may be encoded with instructions corresponding to various aspects of router 17, e.g., protocols. Control unit 30, in some examples, retrieves and executes the instructions from memory for these aspects.

Figure 3:
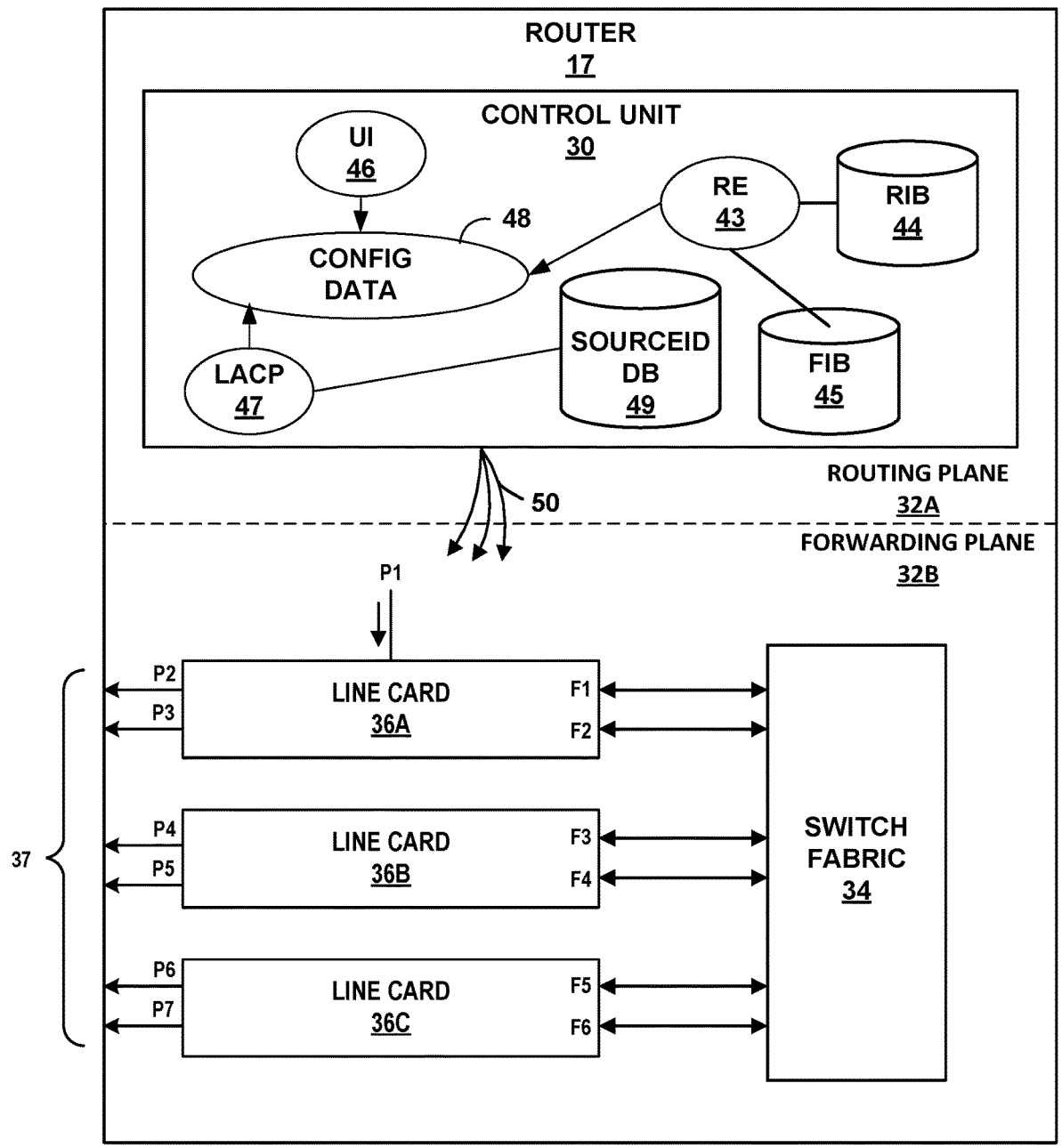
FIG. 3 is a block diagram illustrating an example router and included line cards, in accordance with one or more aspects of the present disclosure.

FIG. 3 is a block diagram illustrating an example router and included line cards, in accordance with one or more aspects of the present disclosure. In the example of FIG. 3, router 17 includes control unit 30, line cards 36A through 36C (collectively "LCs 36"), and switch fabric 34. Each of LCs 36 of FIG. 3 may correspond to line cards present in a chassis-based router and may correspond to the LCs 36 illustrated in FIG. 2. As illustrated in the example of FIG. 3, router 17 includes many of the same elements described in FIG. 2, and elements illustrated in FIG. 3 may correspond to earlier-illustrated elements that are identified by like-numbered reference numerals. In general, such like-numbered elements may be implemented in a manner consistent with the description of the corresponding element provided in connection with FIG. 2, although in some examples, such elements may involve alternative implementation with more, fewer, and/or different capabilities and attributes.

In FIG. 3, each of LCs 36A through 36C include a number of member ports (i.e., P2 through P7) of a link aggregation group or aggregation bundle 37. In the example shown, LC 36A includes ingress port P1, and egress ports P2 and P3. LC 36B includes ports P4 and P5, and LC 36C includes ports P6 and P7. Each of LCs 36 also include one or more fabric interface ports to switch fabric 34. Specifically, in the example shown, LC 36A includes fabric ports F1 and F2, LC 36B includes fabric ports F3 and F4, and LC 36C includes fabric ports F5 and F6. These fabric interface ports provide connectivity across the line cards through switch fabric 34.

In some examples, and as further illustrated in FIG. 4A through 4D, each of LCs 36 may be reachable by any of the other LCs 36, but switch fabric 34 may be configured, in some examples, such that not all LCs 36 may be reachable by any given fabric port. For instance, F1 of LC 36A might not have a path to each of the other LCs 36, and may, for example, only be capable of directly reaching LC 36C and not LC 36B. Although big chassis routers may often have a full crossbar switch plane with full mesh conductivity, other routers (e.g., smaller chassis routers) might not have such full mesh connectivity. Techniques in accordance with one or more aspects of this disclosure may be particularly applicable to and effective in addressing scenarios in which full mesh connectivity is not available.

Three LCs 36 and a limited number of member ingress ports, egress ports, and fabric ports are illustrated in the example of FIG. 3, but the present disclosure encompasses any number of ports and line cards, and techniques in accordance with the present disclosure may be implemented with any number of line cards and ports in other examples.

In the example of FIG. 3, one or more of LCs 36 may choose a member port of a link aggregation port bundle. For instance, in one example, LC 36A receives a packet on P1. A PFE included within line card 36A determines that the packet is to be forwarded to the aggregation bundle, and applies a hashing algorithm to identify the egress port. The hashing algorithm may be performed by either hardware or through a software-based implementation. Based on the hashing, the PFE determines that packet is to be transmitted out P4 (associated with LC 36B), which is reachable via F2 through switch fabric 34 to F3. But in the example of FIG. 2, the path between F2 and F3 through switch fabric 34 may already be congested. Accordingly, forwarding the packet to F3 and then to P4 may lead to packet drop and/or further congestion. In some examples, other legitimate traffic (apart from aggregation bundle 37 destined traffic) which should use the same path within switch fabric 34 may also be adversely affected.

However, by considering bandwidth utilization of fabric interfaces F1 through F6, and utilization of corresponding paths within fabric 34, packet drops and congestion can be avoided in at least some cases. Accordingly, as further described herein, one or more LCs 36 may select a member port of a link aggregation port bundle by considering the fabric interface bandwidth usage and/or utilization. For instance, in some examples, an algorithm to identify relatively low-utilized fabric interfaces or paths through fabric 34 may applied, and one or more of LCs 36 may select a member port from among the identified low-utilization fabric interfaces.

One such algorithm may involve use of two utilization thresholds: a "lower threshold" and a "higher threshold." In such an example, the lower threshold may indicate a low or minimal traffic usage threshold for the given fabric interface, whereas the higher threshold may indicate a higher, or even maximum traffic usage threshold for the given fabric interface. These threshold limits may be calculated based on the speed of the member ports. To apply the algorithm, a member port set is created based on the fabric interface bandwidth utilization, and a member port is selected from the member port set.

To determine bandwidth utilization levels, LCs 36 (e.g., LC 36A) may evaluate virtual output queues maintained by forwarding chips or PFEs within LCs 36 and utilize state information associated with those queues to determine bandwidth associated with each path and/or fabric interfaces. In other examples, LCs 36 may query hardware registers for current traffic rates, and compare those rates to the rate each fabric is capable of to determine to what extent the fabric port is operating relative to the maximum rate and to determine available commitments and bandwidth utilization.

In one example of an algorithm applying a two-threshold system, two sets of member ports (a "global-member-port-set" and a "sub-member-port-set") are created. Ports are added to these member port sets according to the rules of the algorithm, and the selected member port is ultimately chosen from the global-member-port-set. Specifically, the following rules may be applied in such an example.

Step 1: construct the global-member-port-set by adding all local member ports of given bundle based on the ingress traffic line card (e.g., LC 36A in FIG. 3).

Step 2: For each fabric interface (where one of the member ports is reachable): if the utilization bandwidth percentage is lesser than lower-threshold then add the set of member ports which are reachable via this fabric interface to the sub-member-port-set (see, e.g., the example of FIG. 4A).

Step 3: If the sub-member-port-set is empty (i.e., NULL) then all the fabric interfaces crossed the minimum or lower threshold. In such a case, then for each fabric interface (where one of the member ports is reachable): if the utilization bandwidth percentage is lesser than the higher-threshold then add the set of member ports which are reachable via this fabric interface to sub-member-port-set (see, e.g., the example of FIG. 4B).

Step 4: If the sub-member-port-set is not empty (i.e., not NULL) then merge sub-member-port-set with global-member-port-set. However, if the sub-member-port-set is empty/NULL (all the fabric interfaces crossed the maximum threshold), then perform one of the following steps (step 5A or step 5B), depending on whether the global-member-port-set is not NULL:

Step 5A: If the global-member-port-set is not NULL then the local member ports (i.e., P2 and P3 for ingress traffic LC 36A) will be considered here (see, e.g., FIG. 4C).

Step 5B: If the global-member-port-set is NULL then construct global-member-port-set using all member ports of given bundle. (see, e.g., the example of FIG. 4D).

Step 6: Apply a hashing algorithm (based on packet content) to the member ports in the global-member-port-set to select a member port.

In some examples, the foregoing steps are applied to each network packet received by an ingress line card. In other examples, the port sets might not need to be updated for each packet, so the foregoing steps may be applied periodically, or in response to an event (e.g., initiation or termination of a packet flow). In such an example, the global-member-port-set may include the same set of member ports for a period of time until the algorithm is executed again, thereby potentially adjusting the member ports included in the global-member-port-set (and/or in other member port sets). In another example, utilization rates might be monitored and the algorithm may be performed again each time a relevant path crosses a utilization threshold, thereby updating and potentially changing one or more sets of member ports. In another way to implement this example, one or more LCs 36 may maintain, on an ongoing basis, lists of member ports (e.g., a global-member-port-set, a sub-member-port-set, and/or other lists) and update the lists as needed as utilization levels change, thereby necessitating a change to the lists of port sets in a manner consistent with the above-described algorithm or other applicable algorithm.

Figure 4A:
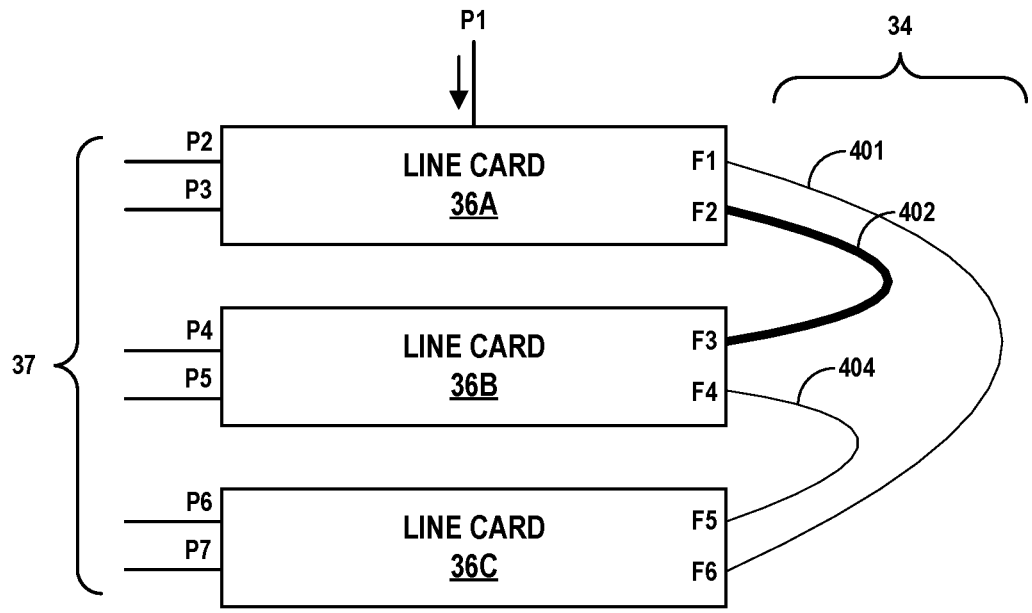
FIG. 4A, FIG. 4B, FIG. 4C, and FIG. 4D are conceptual diagrams illustrating various example scenarios in which an algorithm may be applied to select a member port, in accordance with one or more aspects of the present disclosure.

FIG. 4A, FIG. 4B, FIG. 4C, and FIG. 4D are conceptual diagrams illustrating various example scenarios in which the above algorithm may be applied to select a member port, in accordance with one or more aspects of the present disclosure. In FIG. 4A, LC 36A may determine a member port for an incoming packet destined for aggregation bundle 37 by applying the algorithm described above. For instance, with reference to FIG. 4A, LC 36A creates a global-member-port-set that includes P2 and P3 (step 1) because P2 and P3 are local member ports for LC 36A. In step 2, LC 36A and creates a sub-member-port-set that includes P6 and P7 (associated with LC 36C) because link 401 from LC 36A to LC 36C has a relatively low utilization that is less than the lower threshold. (The relatively low utilization is indicated in FIG. 4A by the thinly-drawn line representing link 401). Link 402 has a higher utilization than the low threshold in this example (note the thicker line representing link 402 in FIG. 4A), so P4 and P5 (associated with LC 36B) are not added to the sub-member-port-set. In the example of FIG. 4A, step 3 does not apply because the sub-member-port-set is not empty. In step 4, the sub-member-port-set is not empty, so LC 36A merges the sub-member-port-set into the global-member-port-set, resulting in a global-member-port-set that includes P2, P3, P6, and P7. Step 5 does not apply because the sub-member-port-set is not empty. The result of the previous steps is that the global-member-port-set includes P2, P3, P6, and P7. Accordingly, LC 36A applies a hash algorithm to select from among P2, P3, P6, and P7 (step 6).

Figure 4B:
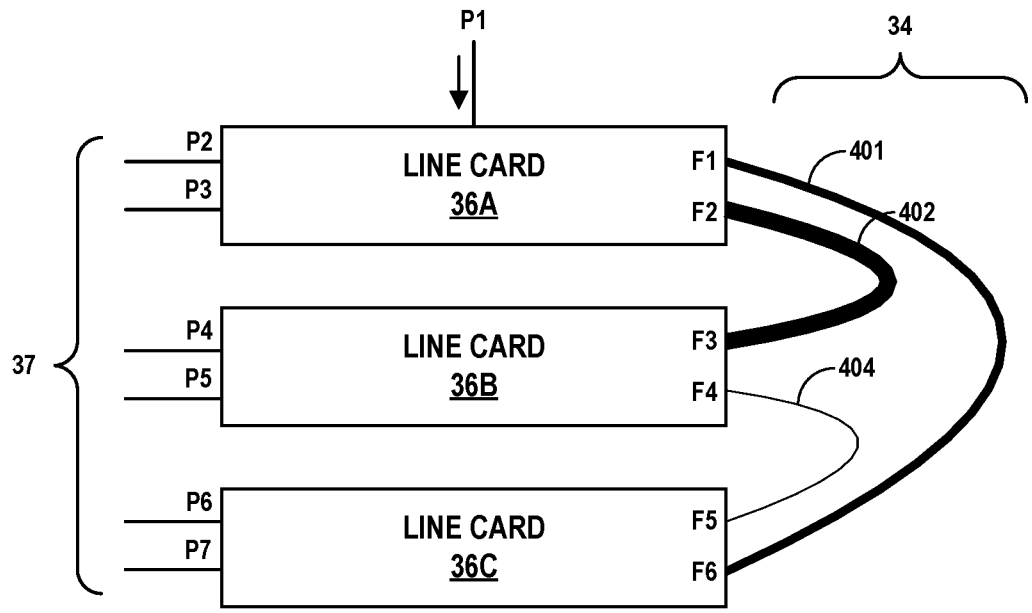

FIG. 4B is another example illustrating the application of the described algorithm, where LC 36A again determines a member port for an incoming packet on P1 destined for aggregation bundle 37. In the example of FIG. 4B, LC 36A creates a global-member-port-set that includes P2 and P3 (step 1), and in step 2, creates a sub-member-port-set that is empty, because link 401 and link 402 are both utilized more than the low threshold (note the relative thickness of lines representing links 401 and 402 in FIG. 4B). In step 3, LC 36A adds P6 and P7 to the sub-member-port-set, because while link 401 is has a higher utilization than the low threshold, link 401 has a lower utilization than the high threshold (note the moderately thickly-drawn line representing link 401). Member ports P4 and P5 are therefore not added to the sub-member-port-set. In step 4, LC 36A merges the sub-member-port-set into the global-member-port-set, so that the global-member-port-set includes P2, P3, P6, and P7. Step 5 does not apply because the sub-member-port-set is not empty. The result is that the global-member-port-set includes P2, P3, P6, and P7. Accordingly, LC 36A applies a hash algorithm to select from among P2, P3, P6, and P7 (step 6).

Figure 4C:
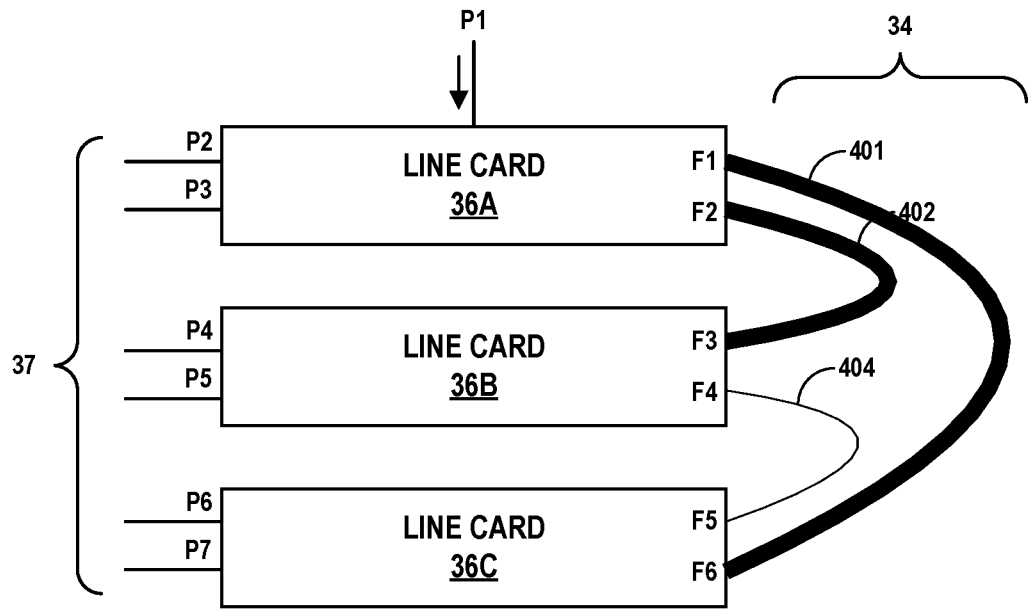

FIG. 4C is another example illustrating the application of the described algorithm, where LC 36A determines a member port for a packet arriving on P1 that is destined for aggregation bundle 37. In the example of FIG. 4C, LC 36A creates a global-member-port-set that includes P2 and P3 (step 1), and in step 2, creates a sub-member-port-set that is empty, because link 401 and link 402 are both utilized more than the low threshold (note thickness of lines representing links 401 and 402 in FIG. 4B). In step 3, LC 36A still does not add any ports to the sub-member-port-set, since both link 401 and link 402 have a higher utilization than the high threshold (note the thickly-drawn line representing links 401 and 402). Step 4 does not apply, since the sub-member-port-set is empty. In step 5, since the global-member-port-set is not empty (it includes P2 and P3), no further additions are made to global-member-port-set. LC 36A therefore applies a hash algorithm to select from among the members of the global-member-port-set, which in the example of FIG. 4C includes P2 and P3 (step 6).

Figure 4D:
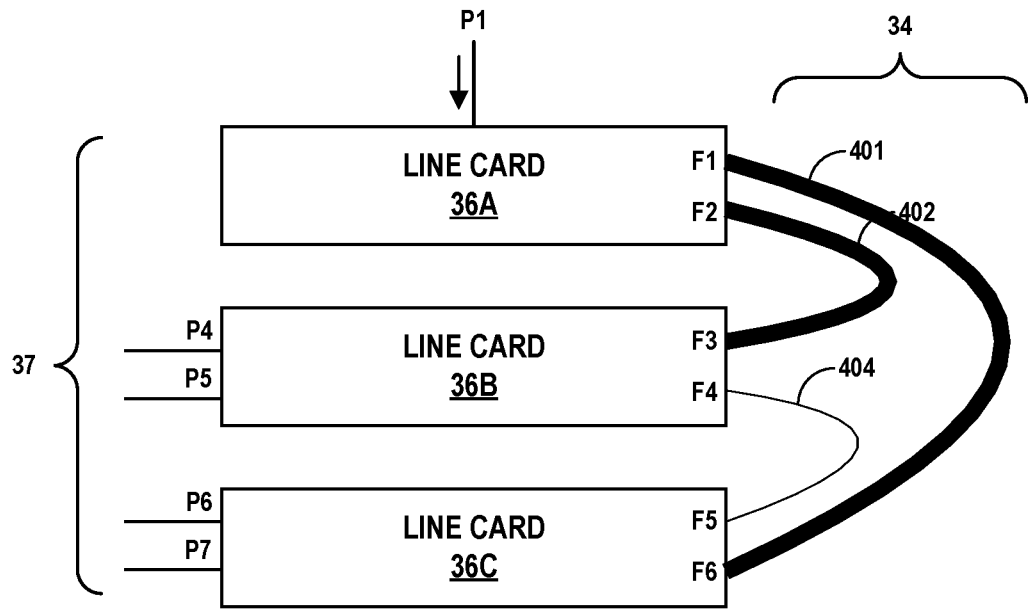

FIG. 4D is another example illustrating the application of the described algorithm, where LC 36A determines a member port for a packet arriving at a line card that has no local member ports (or none that are part of the aggregation group). In the example of FIG. 4D, when a packet arrives at P1 destined for aggregation bundle 37, LC 36A creates a global-member-port-set that is empty, since LC 36A in the example of FIG. 4D has no local member ports, or at least none that are part of the aggregation group (step 1). In step 2, LC 36A creates a sub-member-port-set that is empty, because link 401 and link 402 are both utilized more than the low threshold (note thickness of lines representing links 401 and 402 in FIG. 4B). In step 3, LC 36A still does not add any ports to the sub-member-port-set, since both link 401 and link 402 have a higher utilization than the high threshold (again, note the thickly-drawn line representing links 401 and 402). Step 4 does not apply, since the sub-member-port-set is empty. In step 5, since the global-member-port-set is empty, all member ports are added (P4, P5, P6, and P7), even if utilization is higher than the thresholds (e.g., regardless of utilization). In effect, since all paths are highly-utilized, all paths are considered candidates for output. In step 6, LC 36A applies a hash algorithm to select from among all the member ports in the global-member-port-set (P4, P5, P6, and P7).

In some examples, a different number of thresholds may be used, including more thresholds than simply a low threshold and a high threshold. In such an example, the algorithms described here may be modified to suit the number of thresholds. Where there are more than two thresholds, for example, each threshold may be considered one by one, thereby identifying one or more subsets of member ports that do not exceed one of the lower thresholds, and a hashing algorithm may be applied to those member ports that are less than the lowest applied threshold that results in a group of member ports. Threshold values may be configurable by an administrator or user, or may be configured or adapted automatically by router 17 based on traffic patterns or other considerations.

Figure 5:
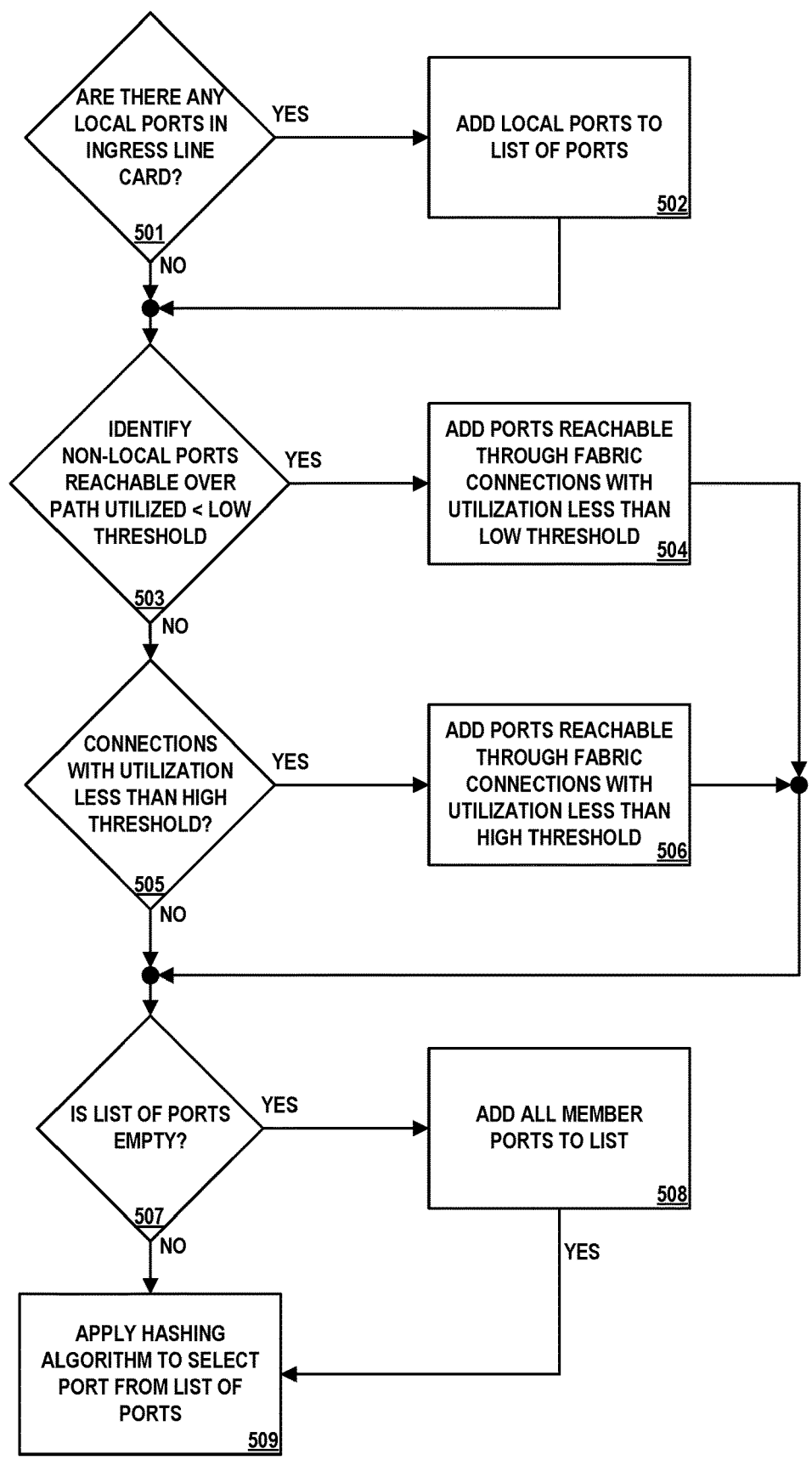
FIG. 5 is a flow diagram illustrating operations performed by an example packet forwarding engine within a line card, in accordance with one or more aspects of the present disclosure.

FIG. 5 is a flow diagram illustrating operations performed by an example packet forwarding engine within a line card, in accordance with one or more aspects of the present disclosure. FIG. 5 illustrates an algorithm that is similar to that described in connection with FIG. 3 and FIG. 4A through FIG. 4D, and operations described in FIG. 5 may be performed by one or more LCs 36 of FIG. 3. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the example of FIG. 5, and in accordance with one or more aspects of the present disclosure, LC 36A may receive network data to be output through an aggregation bundle having a plurality of member ports, each member port associated with one of a plurality of line cards interconnected through a switch fabric, wherein the network data is received by a receiving line card of the plurality of line cards. For instance, in the example of FIG. 3, LC 36A receives data over ingress port P1. LC 36A determines that the data is to be output over aggregation bundle 37.

LC 36A may identify any local member ports from the plurality of member ports (501). For instance, with reference to FIG. 3, LC 36A determines that, as the ingress line card, whether it has any member ports that are part of an aggregation bundle having a plurality of member ports, each member port associated with one of a plurality of line cards (e.g., LCs 36A through 36C in FIG. 3). LC 36A identifies P2 and P3 as local ports, since they are member ports included within LC 36A, the receiving line card.

LC 36A may add the local ports to a list of ports that it maintains within storage (502). For instance, LC 36A maintains a list of ports, and LC 36A adds P2 and P3 to that list in a storage device within LC 36A or otherwise within router 17.

LC 36A may identify one or more non-local member ports from the plurality of member ports, each of the non-local member ports being reachable from the receiving line card over a path through the switch fabric to a different one of the plurality of line cards. For instance, LC 36A may determine that non-local member ports include P4 and P5 (accessible through switch fabric 34 and LC 36B), and P6 and P7 (accessible through switch fabric 34 and LC 36C).

From this group of non-local member ports, LC 36A may identify available non-local member ports by determining, for each of the non-local member ports, whether the path through the switch fabric has utilization less than a low threshold (503). For each such non-local member port reachable over a path having utilization less than the low threshold, LC 36A adds the non-local member port to the list of ports (504).

If there are no non-local member ports having a path through the switch fabric has utilization less than a low threshold, LC 36A may determine available non-local member ports by determining, for each of the non-local member ports, whether the path through the switch fabric has utilization less than a high threshold (505). For each such non-local member port reachable over a path having utilization less than the high threshold, LC 36A adds the non-local member port to the list of ports (506).

LC 36A may determine whether the list of ports that it has maintained is empty (507). If the list of ports is empty, LC 36A adds all member ports to the list (508). To do so, LC 36A adds any local member ports to the list (in the example of FIG. 3, P2 and P3 are local member ports). LC 36A also adds each of the previously-identified non-local member ports that are each reachable from the receiving line card (i.e., LC 36A) over a path through the switch fabric to a different one of the plurality of line cards. In the example of FIG. 3, this includes ports P4, P5, P6, and P7.

LC 36A may select a member port by applying a hashing algorithm to a group that includes each of the member ports in the list (509). For instance, LC 36A may apply a hashing algorithm to a list of ports that consists of the local member ports (P2 and P3) and one or more non-local member ports (e.g., P4, P5, P6, and/or P7). Where LC 36A has no local member ports, LC 36A may apply a hashing algorithm to select one of the non-local member ports, and may output the network data over a fabric interface to reach the selected (non-local) member port. Where LC 36A has local member ports, but paths to non-local member ports are utilized more than the high threshold, LC 36A may apply a hashing algorithm to select one of the local member ports, and may output the network data over circuitry included within LC 36A to reach the selected (local) member port.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, a limited number of devices (e.g., line cards 36 and links 401, 402, 404, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent a limited number of configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system comprising a storage system and processing circuitry having access to the storage system and configured to:
   receive network data to be output through an aggregation bundle having a plurality of member ports, each member port associated with one of a plurality of line cards interconnected through a switch fabric, wherein the network data is received by a receiving line card of the plurality of line cards;
   identify an available non-local member port from the plurality of member ports that is reachable from the receiving line card over a low-utilization path through the switch fabric to a different one of the plurality of line cards;
   select a member port by applying a hashing algorithm to a group that includes the identified available non-local member port; and
   output the network data over a fabric interface to reach the selected member port.

2. The system of claim 1, wherein the available non-local member port is a first available non-local member port, wherein the low-utilization path is a first low-utilization path, and wherein the processing circuitry is further configured to:
   identify a second available non-local member port from the plurality of member ports that is reachable from the receiving line card over a second low-utilization path through the switch fabric.

3. The system of claim 1, wherein the processing circuitry is further configured to:
   identify a local member port from the plurality of member ports, where the local member port is a port of the receiving line card.

4. The system of claim 3, wherein to select a member port, the processing circuitry is further configured to:
  apply the hashing algorithm to the group, wherein the group further includes the local member port.

5. The system of claim 1, wherein to identify the available non-local member port, the processing circuitry is further configured to:
  determine whether the low-utilization path through the switch fabric is utilized less than a threshold utilization value.

6. The system of claim 1, wherein to identify the available non-local member port, the processing circuitry is further configured to:
  identify the available non-local member port in response to detecting an event.

7. The system of claim 1, wherein the processing circuitry is further configured to:
  detect an event that includes detecting that the low-utilization path through the switch fabric has crossed a threshold utilization value.

8. The system of claim 7, wherein to identify the available non-local member port, the processing circuitry is further configured to:
  identify the available non-local member port in response to the event.

9. The system of claim 1, wherein to identify the available non-local member port, the processing circuitry is further configured to:
  determine whether the low-utilization path within the switch fabric is utilized less than a first threshold utilization value; and
  if the low-utilization path is not utilized less than the first threshold utilization value, determine whether the low-utilization path within the switch fabric is utilized less than a second threshold utilization value, the second threshold utilization value being higher than the first threshold utilization value.

10. The system of claim 1, wherein to identify the available non-local member port, the processing circuitry is further configured to:
  determine that the low-utilization path within the switch fabric is utilized more than a first threshold utilization value; and
  determine whether the low-utilization path within the switch fabric is utilized less than a second threshold utilization value, the second threshold utilization value being higher than the first threshold utilization value.

11. The system of claim 10, wherein to determine whether the low-utilization path within the switch fabric is utilized less than a second threshold utilization value, the processing circuitry is further configured to:
  determine that the low-utilization path within the switch fabric is utilized less than the second threshold utilization value.

12. A method comprising:
  receiving, by a receiving line card, network data to be output through an aggregation bundle having a plurality of member ports, each member port associated with one of a plurality of line cards interconnected through a switch fabric, the plurality of line cards including the receiving line card;
  identify, by the receiving line card, an available non-local member port from the plurality of member ports that is reachable from the receiving line card over a low-utilization path through the switch fabric to a different one of the plurality of line cards;
  selecting, by the receiving line card, a member port by applying a hashing algorithm to a group that includes the identified available non-local member port; and
  outputting, by the receiving line card, the network data over a fabric interface to reach the selected member port.

13. The method of claim 12, wherein the available non-local member port is a first available non-local member port, wherein the low-utilization path is a first low-utilization path, and wherein the method further comprises:
  identifying, by the receiving line card, a second available non-local member port from the plurality of member ports that is reachable from the receiving line card over a second low-utilization path through the switch fabric.

14. The method of claim 12, wherein the method further comprises:
  identifying, by the receiving line card, a local member port from the plurality of member ports, where the local member port is a port of the receiving line card.

15. The method of claim 14, wherein selecting the member port includes:
  applying the hashing algorithm to the group, wherein the group further includes the local member port.

16. The method of claim 12, wherein identifying the available non-local member port includes:
  determining whether the low-utilization path through the switch fabric is utilized less than a threshold utilization value.

17. The method of claim 12, wherein identifying the available non-local member port includes:
  identifying the available non-local member port in response to detecting an event.

18. The method of claim 12, wherein the method further comprises:
  detecting an event that includes detecting that the low-utilization path through the switch fabric has crossed a threshold utilization value.

19. The method of claim 18, wherein identifying the available non-local member port includes:
  identifying the available non-local member port in response to the event.

20. A non-transitory computer-readable storage medium comprising instructions that, when executed, configure processing circuitry of a computing system to:
  receive network data to be output through an aggregation bundle having a plurality of member ports, each member port associated with one of a plurality of line cards interconnected through a switch fabric, wherein the network data is received by a receiving line card of the plurality of line cards;
  identify an available non-local member port from the plurality of member ports that is reachable from the receiving line card over a low-utilization path through the switch fabric to a different one of the plurality of line cards;
  select a member port by applying a hashing algorithm to a group that includes the identified available non-local member port; and
  output the network data over a fabric interface to reach the selected member port.

* * * * *